(12) United States Patent
Choe et al.

(10) Patent No.: US 10,241,743 B2
(45) Date of Patent: Mar. 26, 2019

(54) MOBILE TERMINAL FOR MATCHING DISPLAYED TEXT WITH RECORDED EXTERNAL AUDIO AND METHOD OF CONTROLLING THE MOBILE TERMINAL

(71) Applicant: LG ELECTRONICS INC., Seoul (KR)

(72) Inventors: Dami Choe, Seoul (KR); Hyungsup Kim, Seoul (KR); Wonseok Joung, Seoul (KR); Jungmin Park, Seoul (KR); Yongkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 752 days.

(21) Appl. No.: 14/771,452

(22) PCT Filed: Jan. 24, 2014

(86) PCT No.: PCT/KR2014/000708
§ 371 (c)(1),
(2) Date: Aug. 28, 2015

(87) PCT Pub. No.: WO2014/137074
PCT Pub. Date: Sep. 12, 2014

(65) Prior Publication Data
US 2016/0011847 A1 Jan. 14, 2016

(30) Foreign Application Priority Data
Mar. 5, 2013 (KR) .................. 10-2013-0023540

(51) Int. Cl.
*G06F 3/0481* (2013.01)
*G06F 3/16* (2006.01)
(Continued)

(52) U.S. Cl.
CPC .............. *G06F 3/165* (2013.01); *G06F 3/038* (2013.01); *G06F 3/0484* (2013.01);
(Continued)

(58) Field of Classification Search
CPC .. G06F 3/048; G06F 3/04842; G06F 3/04847; G06F 15/025; G10L 13/00; G09F 27/00; G06Q 30/02
See application file for complete search history.

(56) References Cited

U.S. PATENT DOCUMENTS 6,260,011 B1 7/2001 Heckerman et al.
2002/0099552 A1* 7/2002 Rubin ................ G09F 27/00
704/270
(Continued)

FOREIGN PATENT DOCUMENTS

KR 10-2012-0135137 12/2012

OTHER PUBLICATIONS

PCT International Application No. PCT/KR2014/000708, Written Opinion of the International Searching Authority dated May 1, 2014, 1 page.

*Primary Examiner* — Haoshian Shih
(74) *Attorney, Agent, or Firm* — Lee, Hong, Degerman, Kang & Waimey

(57) ABSTRACT

The present invention relates to a mobile terminal capable of recording audio and a method of controlling the mobile terminal. Furthermore, the present invention relates a mobile terminal capable of outputting visual information and a method of controlling the mobile terminal. Provided is the mobile terminal including a recording function unit that records external audio, a display unit to which visual information is output, and a controller that performs processing by associating the audio recorded through the recording function unit and the visual information that is output to the (Continued)

display unit with each other, in which in response to selection of one region of the display unit, the controller matches the visual information included in the one region and the audio recorded through the recording function unit.

11 Claims, 15 Drawing Sheets

(51) Int. Cl.
*G11B 27/34* (2006.01)
*G06F 3/038* (2013.01)
*G06F 3/0484* (2013.01)
*G10L 15/26* (2006.01)
*H04M 1/725* (2006.01)

(52) U.S. Cl.
CPC ...... *G06F 3/04817* (2013.01); *G06F 3/04842* (2013.01); *G06F 3/04847* (2013.01); *G06F 3/167* (2013.01); *G10L 15/26* (2013.01); *G11B 27/34* (2013.01); *G06F 2203/0381* (2013.01); *H04M 1/7255* (2013.01); *H04M 2250/22* (2013.01)

(56) References Cited

U.S. PATENT DOCUMENTS

| | | |
|---|---|---|
| 2002/0129057 A1 | 9/2002 | Spielberg |
| 2009/0006191 A1* | 1/2009 | Arankalle ............ G06Q 30/02 705/14.71 |
| 2010/0324709 A1* | 12/2010 | Starmen ............... G06F 15/025 700/94 |
| 2010/0324895 A1 | 12/2010 | Kurzweil et al. |
| 2012/0310642 A1* | 12/2012 | Cao ....................... G10L 13/00 704/235 |

* cited by examiner

MOBILE TERMINAL FOR MATCHING DISPLAYED TEXT WITH RECORDED EXTERNAL AUDIO AND METHOD OF CONTROLLING THE MOBILE TERMINAL

TECHNICAL FIELD

The present invention relates to a mobile terminal capable of recording audio and a method of controlling the mobile terminal.

BACKGROUND ART

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

In recent years, a variety of attempts, novel in many respects, has been made in novel ways to realize such multiple functions in software or in hardware. As one example, a user interface environment is provided in which a user executes audio recording easily and conveniently.

However, when performing the audio recording in the current user interface environment, only the audio recording function is executed, and a method of utilizing visual information that is output to a display unit is not considered.

DISCLOSURE OF THE INVENTION

Therefore, an object of the present invention is to provide a mobile terminal capable of providing audio along with visual information associated with the audio and a method of controlling the mobile terminal.

To achieve these and other advantages and in accordance with the purpose of the present invention, as embodied and broadly described herein, there is provided a mobile terminal including a recording function unit that records external audio, a display unit to which visual information is output, and a controller that performs processing by associating the audio recorded through the recording function unit and the visual information that is output to the display unit with each other, in which in response to selection of one region of the display unit, the controller matches the visual information included in the one region and the audio recorded through the recording function unit. In the mobile terminal, the controller may match the audio being recorded through the recording function unit with a point in time corresponding to a point in time when the one region is selected.

In the mobile terminal, in response to any one of a request for outputting of the visual information included in the one region and a request for outputting of the matched audio, the controller may output the visual information included in the one region and the audio that is matched with the visual information included in the one region.

In the mobile terminal, the selection of the one region may be made through a predetermined-type input touch that is applied with respect to the one region, and the controller may match the audio that has been recorded a predetermined time earlier than a point in time when the one region is selected with the visual information included in the one region.

In the mobile terminal, a graphic object alerting a user that the audio is being recorded through the recording function unit may output to the display unit, and based on the selection of the graphic object and the one region, the controller may match the visual information included in the one region and the audio being recorded through the recording function unit.

In the mobile terminal, the selection of the graphic object and the one region may be made through a first input touch with respect to the graphic object and a second input touch that is in succession to the first input touch and is ended at one point corresponding to the one region.

In the mobile terminal, the graphic object may be a progress bar indicating a status on progress in the recording of the audio by the recording function unit, and when the first input touch is applied with respect to the progress bar, the controller may match the audio that is recorded at a point in time corresponding to a point in time when the first input touch is applied with the visual information included in the one region.

In the mobile terminal, the controller may convert the audio that is recorded through the recording function unit into text, based on speech-to-text (SST) conversion and output at least one part of the resulting text to close to or the vicinity of the progress bar, and the at least one part of the text may be output to a position that corresponds to a point on the progress bar that corresponds to a point in time when the audio corresponding to the at least one part of the text is recorded.

In the mobile terminal, the controller may output an icon that alerts a user that the visual information included in the one region is matched with a region corresponding to a point on the progress bar, to which the first input touch is applied.

In the mobile terminal, when the icon is selected after ending the recording of the audio by the recording function unit, the controller may output the visual information included in the one region, along with the audio that is recorded at a point in time corresponding to the point to which the first input touch is applied.

In the mobile terminal, the controller may display at least one part of the visual information, included in the one region, of the visual information being output to the display unit, in a highlighting manner, or may output an icon that alerts a user to the presence of the audio matched with a region adjacent to the one region.

In the mobile terminal, in response to selection of the at least highlighted one part of visual information or the icon, the controller may output the matched audio.

In the mobile terminal, an amount of the audio matched with the visual information included in the one region may be represented by a time from a point in time corresponding to a point in time when the one region is selected to a point in time when a command to end the matching is generated.

In the mobile terminal, the command to end the matching may be generated based on a predetermined-type input touch that is applied to the display unit, or if point-in-time information corresponding to point-in-time information included in the one region is the last unit of predetermined units.

To achieve these and other advantages and in accordance with the purpose of the present invention, as embodied and broadly described herein, there is provided a method of controlling the mobile terminal including a display unit to which visual information is output, the method including recording external audio in a state where the visual information is output to the display unit, receiving a user's request for matching the visual information that is output to the display unit and the audio being recorded, and matching at least one part of the visual information and the audio that is recorded at a point in time corresponding to a point in time when the user's request is received, in response to the receiving of the user's request.

The method may further include displaying a graphic object alerting the user that the audio is matched with the vicinity of the visual information, which corresponds to the at least one part.

In the method, the displaying of the graphic object may include outputting the audio matched with the visual information corresponding to the at least one part, in response to the selection of the graphic object.

MODES FOR CARRYING OUT THE PREFERRED EMBODIMENTS

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
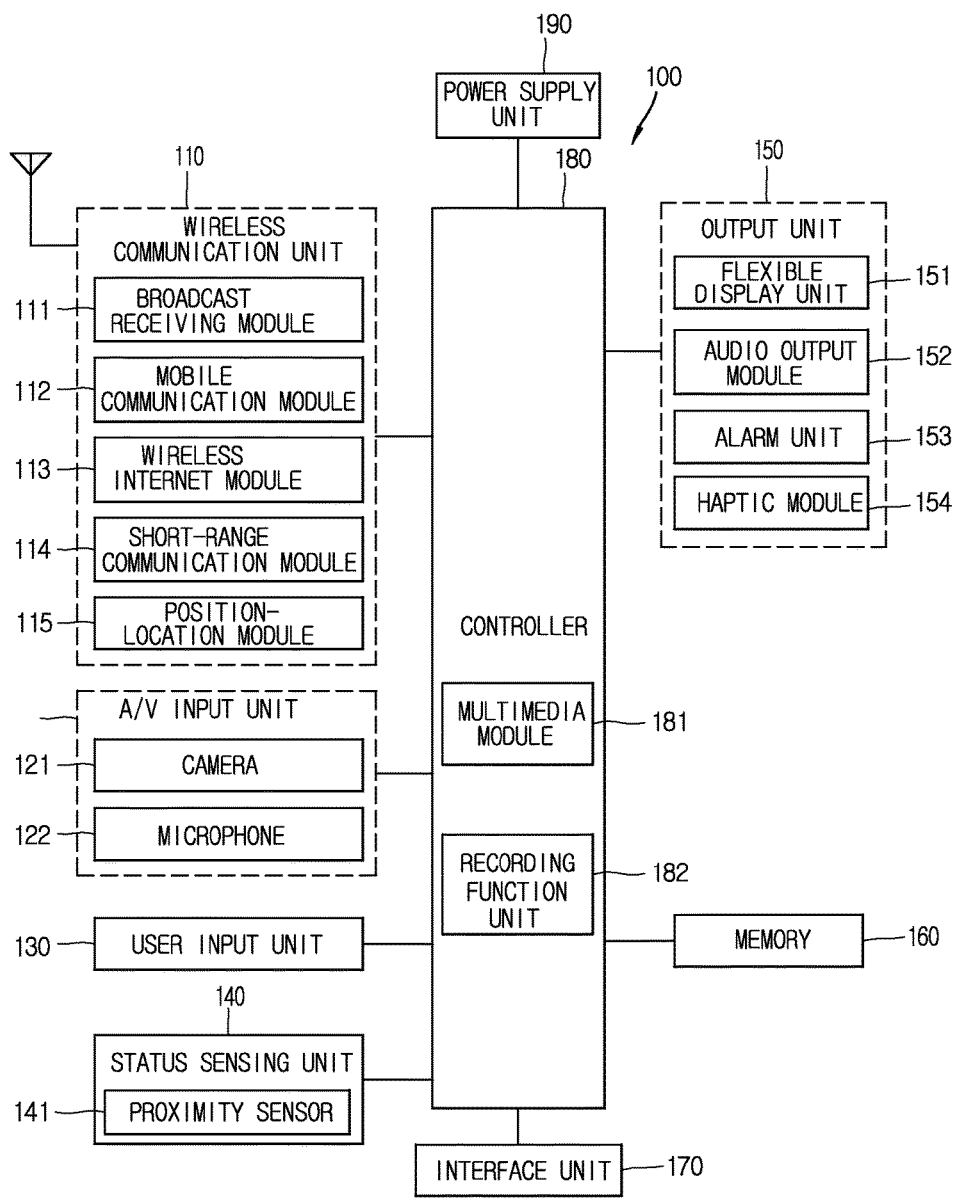
FIG. 1 is a block diagram illustrating a mobile terminal according to one embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may comprise a proximity sensor 141, a 3D touch sensing unit 142, an ultrasonic sensing unit 143 and a camera sensing unit 144. The sensing unit 140 may be configured as a 3D sensor for sensing a position of an object which moves in a 3D space (hereinafter, will be referred to as an 'object to be sensed'). The object to be sensed may be a user's body (finger), an accessory device, etc.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen there_through, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure there_between, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure. Here, the touch object is an object to apply touch to the touch sensor, which may be a finger, a touch pen, a stylus pen, a pointer, etc.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, the proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied there through to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
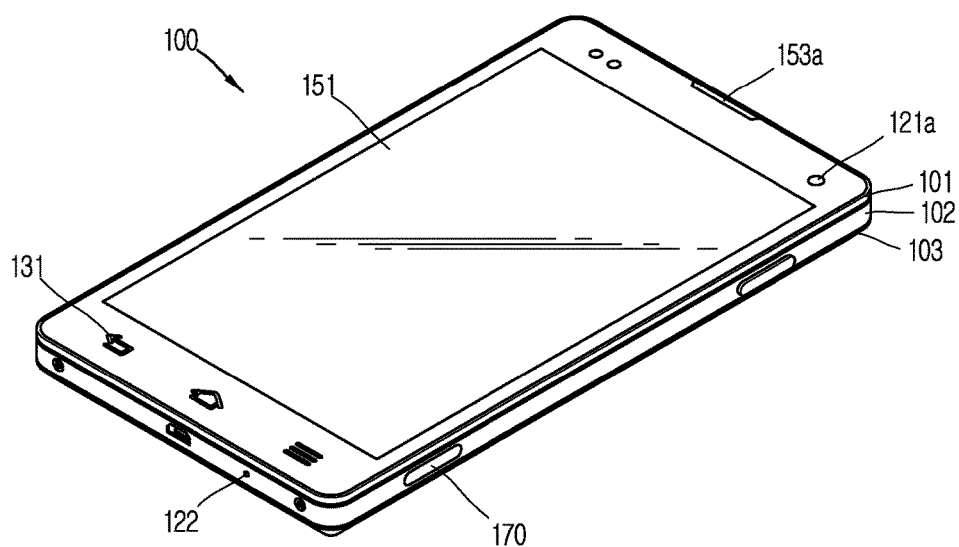
FIGS. 2A and 2B are perspective views, each illustrating the mobile terminal according to one embodiment of the present invention when viewed from the front side.
Figure 2B:
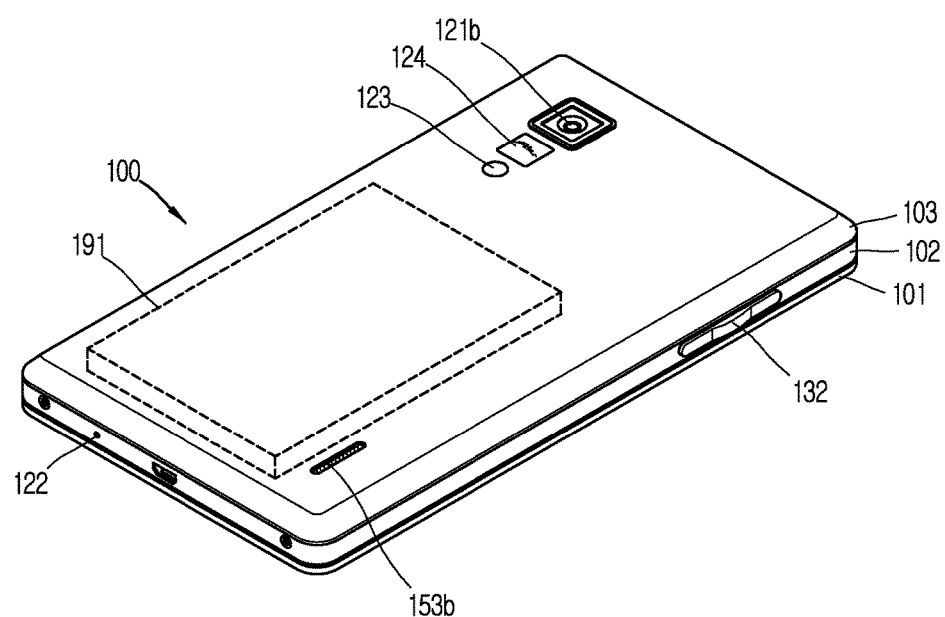

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display 151, the touch pad 135 may be formed to be light-transmissive. In this case, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display 151 of the front case 101. The touch pad 135 may be disposed on the rear surface of the display 151 in parallel. The touch pad 135 may have a size equal to or smaller than that of the display 151.

Matching of audio information and visual information is possible in the mobile terminal according to one embodiment of the present invention that can include at least one or more of the constituent elements described above. That is, on the display unit 151 of the mobile terminal according to one embodiment of the present invention, it is possible to match the visual information that is output through an application corresponding to an electronic book (e-book) function, an electronic note function, or an electronic memo function, and audio that is input through the microphone 121 or is output through the audio output module 152. The matching here means processing that matches the visual information and the audio. For example, in the case of the outputting of the visual information, the processing includes outputting the visual information along with the matched audio and providing a UI environment in which the visual information can be output along with the matched audio.

On the other hand, the audio that can be matched with the visual information comes in a variety of types. The audio here is one of the following: the audio of which recording is in progress, the audio of which recording is completed, the audio that is stored in a memory, and the audio that is streamed in real time from an external server.

On the other hand, the visual information here means information that is output to the display unit 151 and is identifiable by a user. The controller 180 can match at least one part of the visual information that is output to the display unit 151 with the audio. One part visual information here is selected by the user or is automatically selected by the controller 180. That is, the controller 180 selects at least one part visual information to be matched with the audio from the visual information to be output to the display unit 151 according to predetermined criteria.

If the user takes note or uses an electronic book while listening to a lecture, the mobile terminal according to the present invention can provide him/her with a function of recording content of the lecture in this manner. Furthermore, if the user wants to match one part of the lecture being recorded with the notes or with content of the electronic book, the mobile terminal according to the present invention can provide him/her with a graphic user interface (GUI) environment in which this matching is effectively done.

Figure 3:
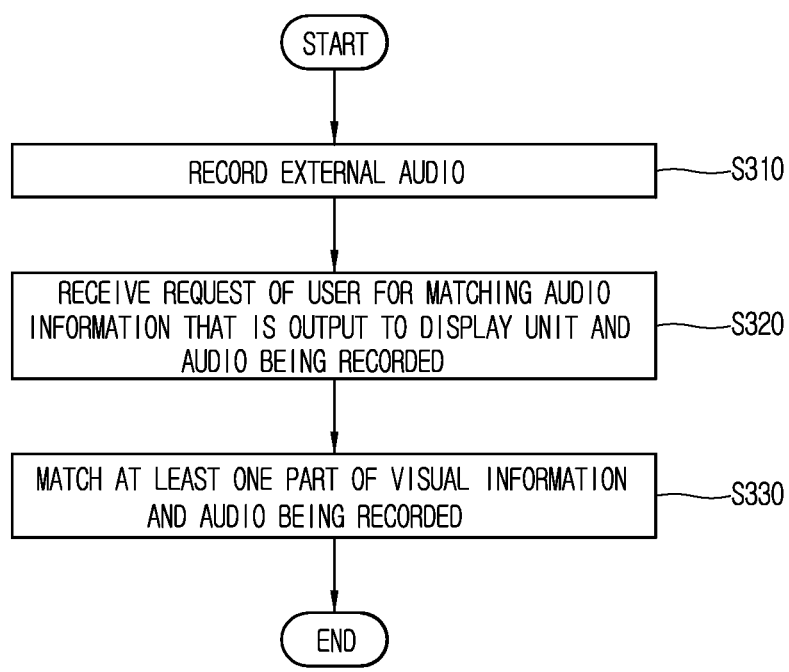
FIG. 3 is a flowchart for describing a method of controlling the mobile terminal according to one embodiment of the present invention.

A method of matching the audio and the visual information is described in detail below referring to the accompanying drawings. FIG. 3 is a flowchart for describing a method of controlling the mobile terminal according to one embodiment of the present invention. FIGS. 4(a) to 4(c) are diagrams for describing the method of controlling the mobile terminal in FIG. 3.

According to the following embodiments, as an example, a case in which the recording of the audio is in progress is described, but in the mobile terminal according to the present invention, in a case other than in which the recording of the audio is in progress, the matching of the audio and the visual information is possible. The case other than the case in which the recording of the audio is in progress includes a case in which the recording-completed audio is output, a case in which the audio stored in the memory is output, and a case in which the audio streamed in real time from the external server is being output.

In the method of controlling the mobile terminal according to one embodiment of the present invention, a step of recording external audio is executed S310.

When the external audio is input through a microphone 122, a recording function unit 182 records audio that is input through the microphone 122 at the request of the user. The recorded audio is stored in the memory 160. The user's request is received through an application corresponding to a recording function and when a graphic object (or an icon) corresponding to the recording function is selected, is received. On the other hand, the recording function unit 182 is under control of the controller 180, and the controller 180 can play a role of the recording function unit 182.

On the other hand, the user's request for recording the audio is received in a state in which a predetermined type of visual information is output on the display unit 151. The predetermined type of visual information here is an execution screen or GUI of an application corresponding to the predetermined type.

The user's request for recording the audio is received through the application corresponding to the predetermined type. For example, if the application corresponding to the predetermined type is the application corresponding to the electronic note function, the graphic object (or the icon) through which to receive the user's request for recording the audio is included in the execution screen or GUI of the application corresponding to the electronic note function. Therefore, when the graphic object is selected through the execution screen or GUI of the application corresponding to the electronic note function, the controller 180 determines that the request to record the audio is received and performs the recording on the external audio that is input through the microphone 122. Therefore, in this case, information (for example, content of the notes) is input from the user into the mobile terminal. The mobile terminal outputs the information that is input and at the same time records the external audio. For example, as illustrated in FIG. 4(a), the outputting of the visual information 410 and the recording of the audio are performed through one application. On the other hand, while the recording is in progress, graphic objects 420 and 421 indicating that the recording of the audio is currently in progress are output to the display unit 151. Information associated with the recording (for example, time that elapses from the start of the recording and the like) is output to the graphic objects. On the other hand, when the graphic object 420 is selected before recording the audio, the recording is performed. That is, the controller 180 controls the recording function unit 182 in such a manner that the recording is performed in response to the selection of the graphic object 420.

On the other hand, the application corresponding to the predetermined type is an application corresponding to a function (for example, the application corresponding to the electronic note, the electronic memo, or a scheduler function) into which the information is input, or an application corresponding to an information reading function (for example, an application corresponding to an electronic book function, an electronic newspaper function, an electronic news function, or a web browser function).

The application corresponding to the predetermined type provides also an audio recording function. In addition, in the mobile terminal according to the present invention, although the applications described above do not provide the audio recording function, the mobile terminal itself can provide the recording function.

On the other hand, in this manner, a step is executed in which while the recording of the audio is in progress, the user's request for matching the visual information being output to the display unit and the audio being recorded is received (S320). The user's request for the matching is made by employing various ways such as an input touch with respect to the mobile terminal, an input using a key provided in the mobile terminal, a voice input through a voice command, and a motion input.

As one example, the user's request for the matching corresponds to the selection of one region of the display unit 151 by the input touch. That is, when the one region is selected using the predetermined touch type, the controller 180 determines this as the reception of the user's request for the matching.

When the user's request for matching the visual information and the audio is received in this manner, a step is executed in which at least one part of the visual information and the audio being recorded are matched (S330).

The at least one part of the visual information here is visual information that is selected by the user from the visual information displayed on the display unit 151. In addition, the at least one part of the visual information is information associated with the audio being recorded. For example, the controller 180 converts the audio being recorded into text using speak-to-text conversion and automatically selects the visual information corresponding to the resulting text.

On the other hand, the audio that is matched with the at least one part of the visual information may correspond to the entire audio that is recorded. In addition, the audio is matched with the at least one part of the visual information may correspond to one part of the entire audio that is recorded. The at last one part of the visual information here may be recorded at a specific point in time. For example, the controller 180 matches the audio that is being recorded at the specific time in point when the user's request for the matching is received, with the at least one part of the visual information. In addition, the controller 180 controls an amount of the audio that is matched automatically or on the basis of the selection by the user. The selection by the user is made by using various ways such as the input touch, the voice command, and the motion input.

On the other hand, the controller 180 can match the audio that has been recorded a predetermined time earlier than the point in time when the user's request for the matching is received, with the visual information included in the one region.

Figure 4:
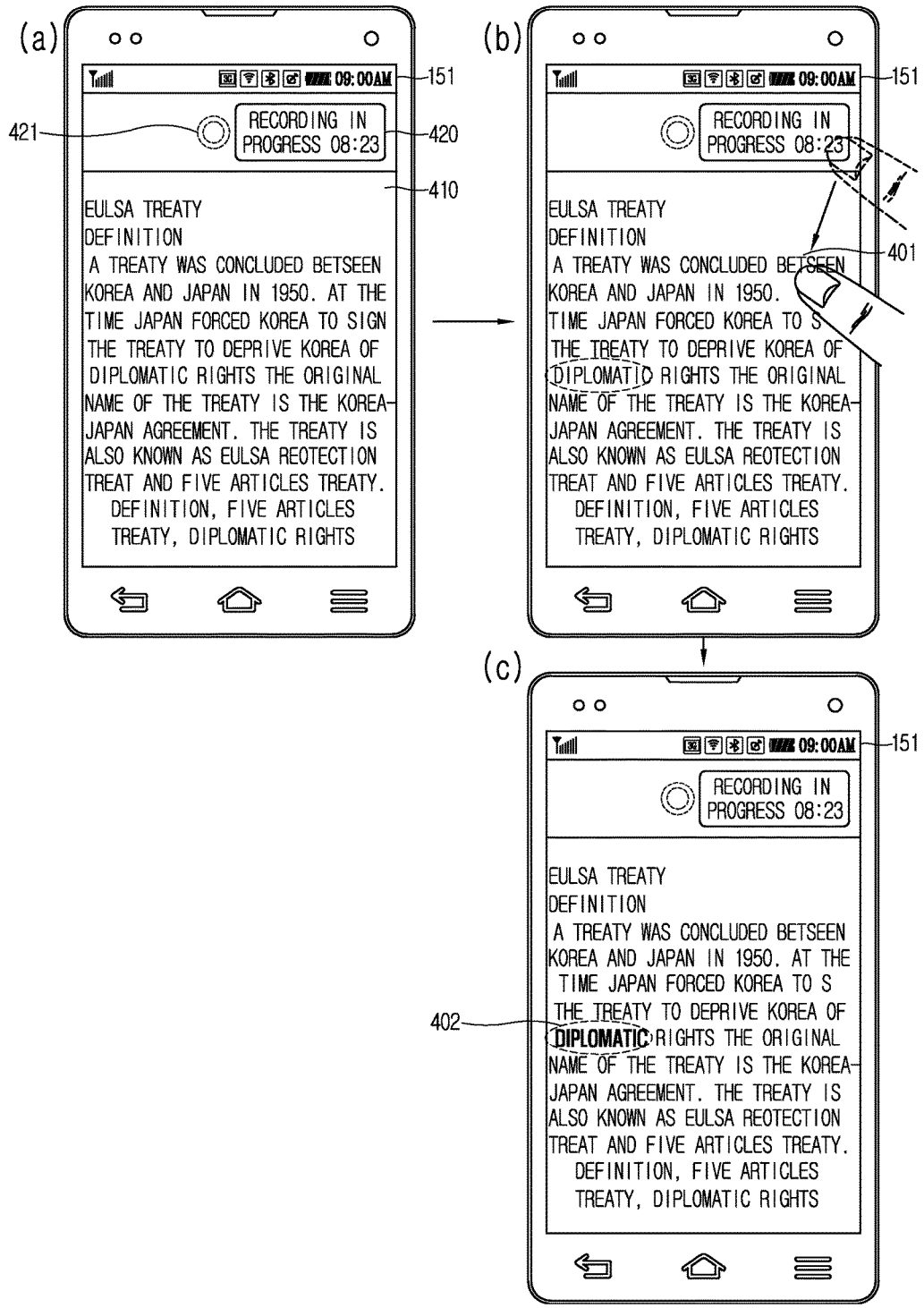
FIGS. 4(a), 4(b) and 4(c) are diagrams for describing the method of controlling the mobile terminal in FIG. 3.

One example of the user's request for matching the visual information and the audio is described. The controller 180 receives the user's request when a first input touch with respect to the graphic object 420 and a second input touch that is in succession to the first input touch and is ended at one point 401 on the display unit, to which the visual information is output are applied as illustrated FIG. 4(*b*). Here, the visual information included in a region corresponding to the one point 401 is set as the visual information to be matched with the audio, in response to the ending of the second input touch at the one point 401. Therefore, as illustrated in FIG. 4(*c*), the visual information that is output to a region 402 corresponding to the one point and the audio that is recorded at a point in time (for example, about 8 minutes 24 seconds after the start of the recording) to which the first input is applied are matched with each other. On the other hand, as illustrated is FIG. 4(*c*), the visual information that is matched with the audio (for example, "diplomatic rights") is displayed in such a manner that it is distinguishable from other visual information.

On the other hand, a size of the region that is matched with the one point differs according to the visual information that is output. The controller 180 sets a region that corresponds to the one point, based on a predetermined unit. For example, the predetermined unit includes a syllable unit, a word unit, a paragraph unit, and so on.

On the other hand, although not illustrated, if the user's request for matching with the audio is received, the controller 180 can match information that is input into the mobile terminal after receiving the user's request, not time information that is already output to the display unit 151, with the audio. That is, the user can take notes using the electronic note and at the same time, can match the audio being recorded with the notes.

On the other hand, as described above, the embodiments can be applied not only to the case where the audio is recorded but also the case where the audio is output in the mobile terminal. Therefore, according to the embodiment in which the audio is output, the "audio that is recorded at the time when the user's request for the matching is applied," is understood as the "audio that is output at the time when the user's request for the matching is applied.

Figure 5A:
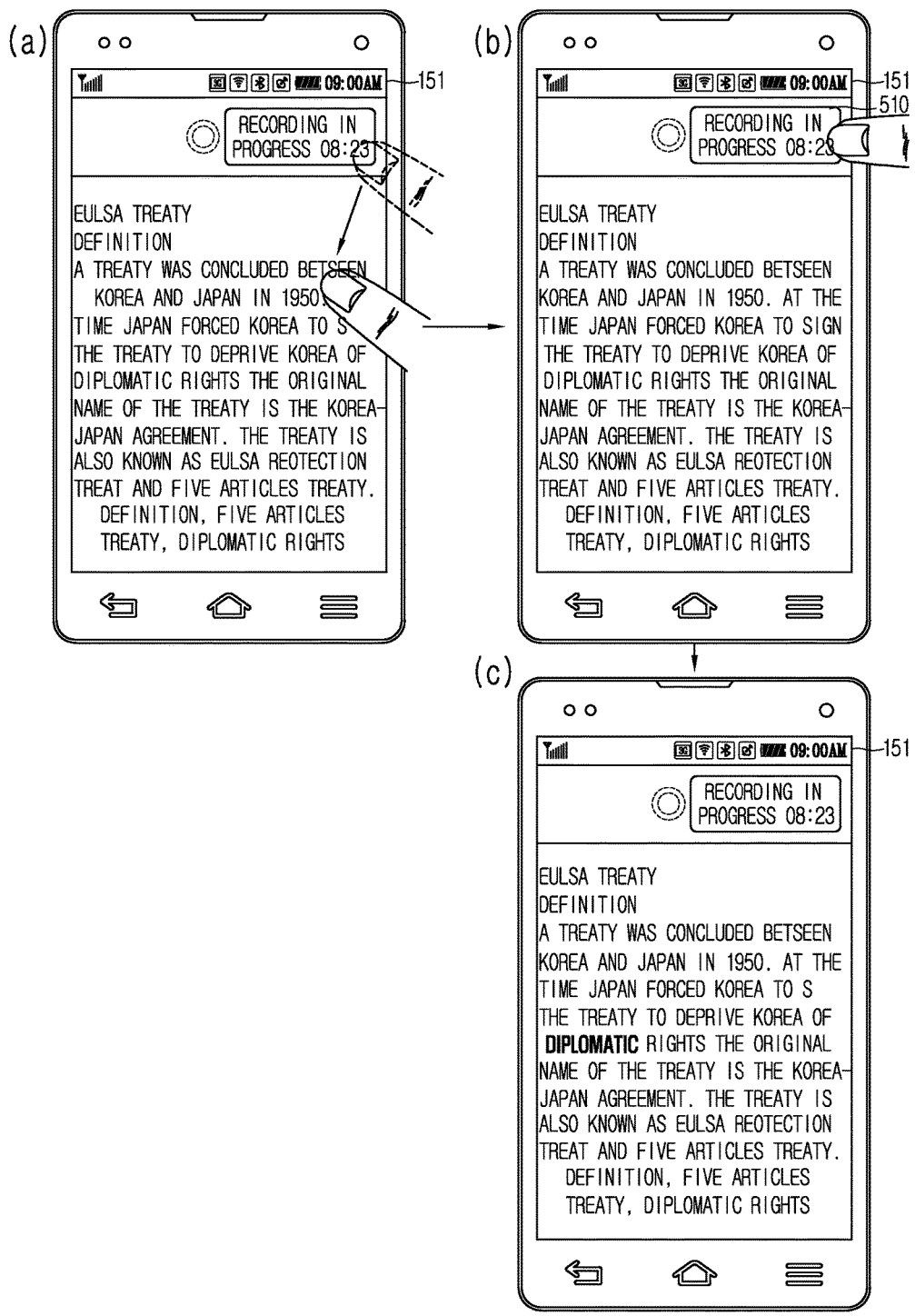
FIGS. 5A(a), 5A(b), 5A(c) 5B(a), 5B(b) and 5B(c) are diagrams for describing a method of performing matching in the mobile terminal according to one embodiment of the present invention.

A method of determining a point in time when the matching is ended to control the amount of the audio being matched is described in detail below referring to the accompanying drawings. FIGS. 5A(a) to 5A(c) and FIGS. 5B(a) to 5B(c) are diagrams for describing the method of performing the matching in the mobile terminal according to one embodiment of the present invention.

First, referring to FIGS. 5A(a) to 5A(c) a method of applying the user's request for the matching in FIGS. 5A(a) to 5A(c) is the same as that described in FIGS. 4(*a*) to 4(*c*), and thus a detailed description thereof is omitted.

When a graphic object 510 corresponding to the recording function, as illustrated in FIG. 5A(b), is selected while matching the visual information and the audio being recorded, the controller 180 ends the matching in this manner. In this case, as illustrated in FIG. 5A(c), the controller 180 displays a part of the visual information that is matched with the audio (for example, "diplomatic rights") in such a manner that the part is highlighted. In this case, the amount of the matched audio corresponds to the audio that is recorded from 8 minutes 24 seconds to 9 minutes 30 seconds after the start of the recording.

On the other hand, although the graphic object 510 is selected, the controller 180 continues to perform the recording without any interruption.

Figure 5B:
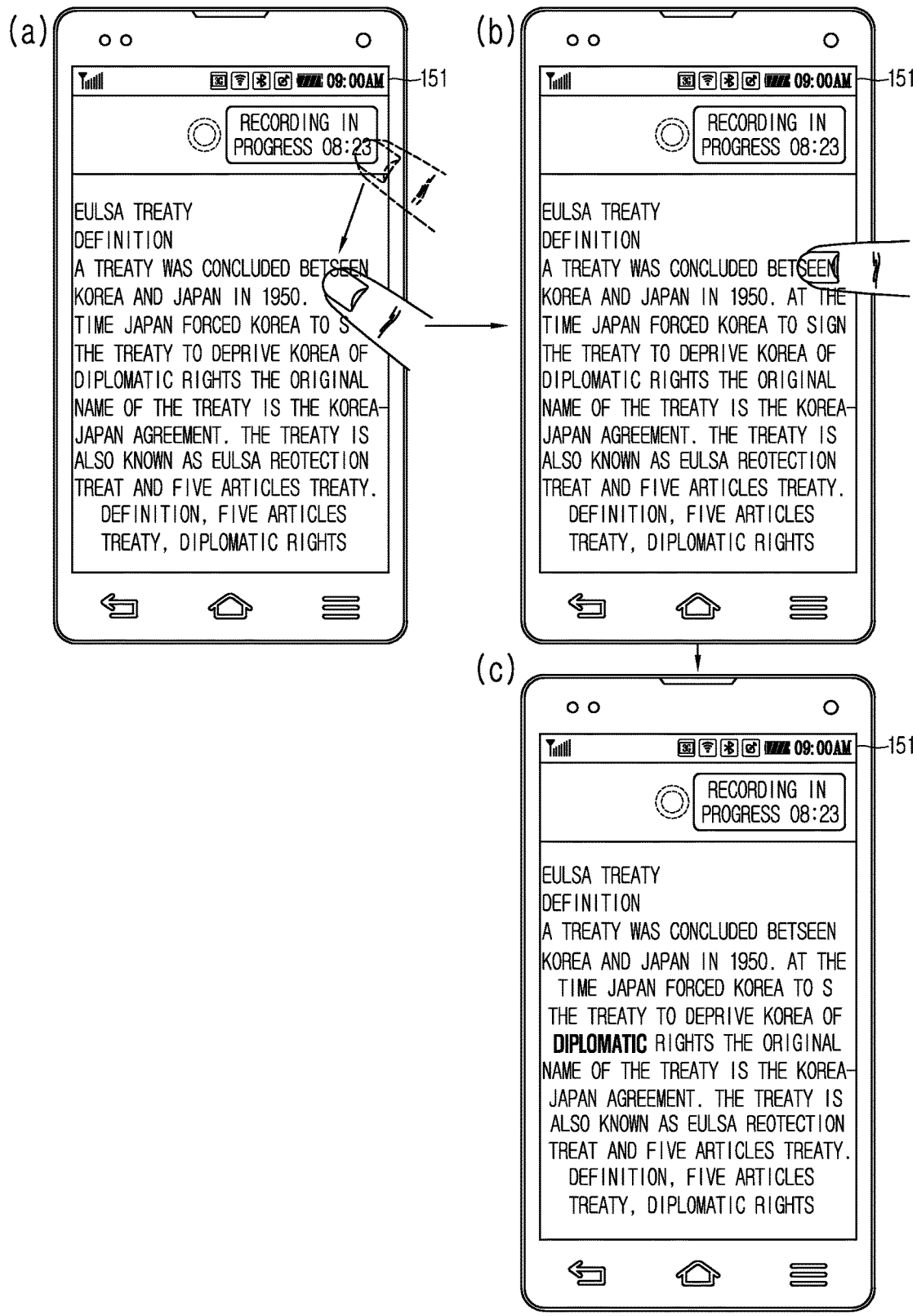

As another example, referring to FIGS. 5B(a) to 5B(c), if the part of the visual information that is matched (for example, "diplomatic rights") is again selected after receiving the user's request for the matching, the controller 180 ends the matching as illustrated in FIG. 5B(b).

As described above, a control command to end the matching is generated based on the selection by the user. The selection by the user is made by using various ways such as the input touch, the voice command, and the motion input.

Figure 6A:
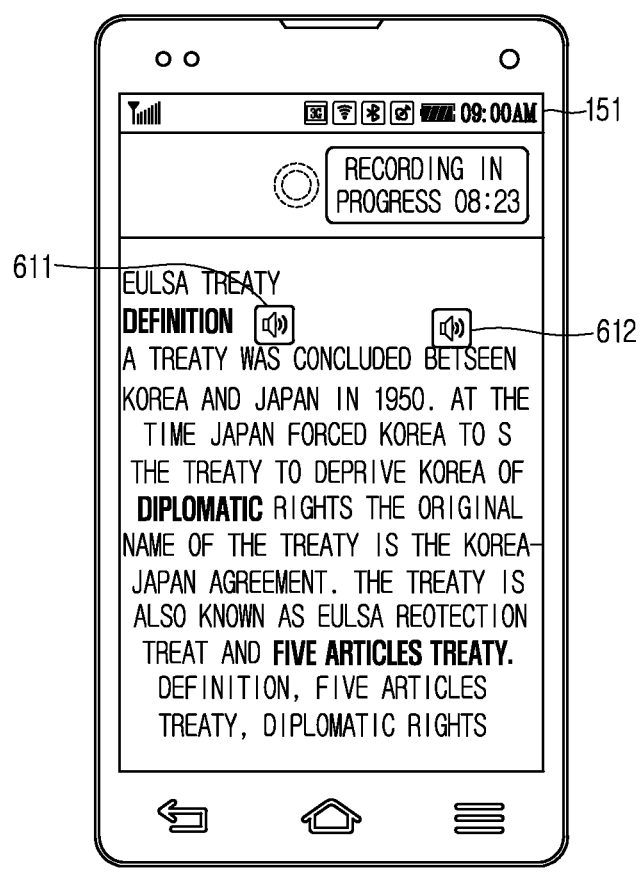
FIGS. 6A and 6B are diagrams for describing a method of alerting a user to the presence of matched information in the mobile terminal according to one embodiment of the present invention.
Figure 6B:
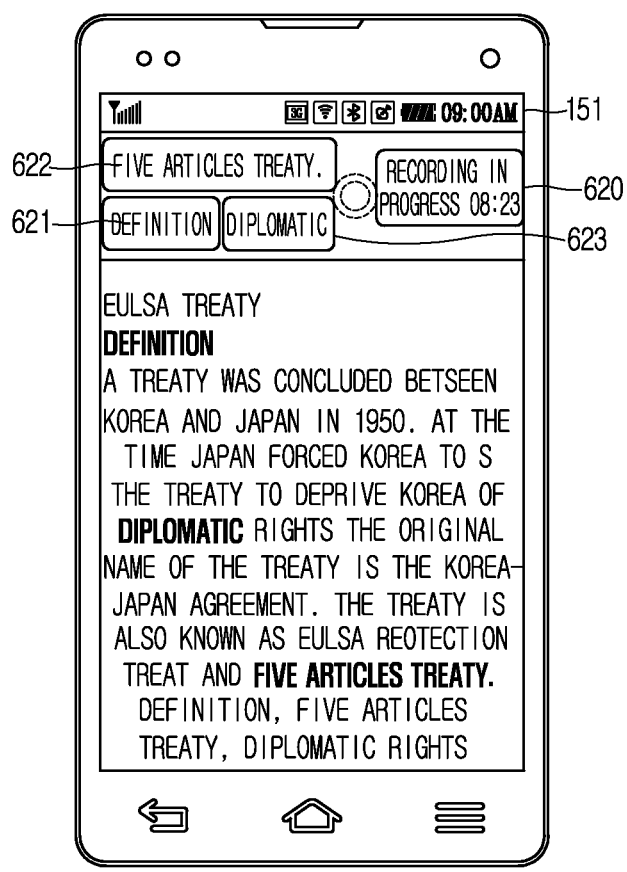

A method of alerting the user to the presence of the audio that is matched with the visual information is described in detail below referring to the accompanying drawings. FIGS. 6A and 6B are diagrams for describing the method of alerting the user to the presence of the matched information in the mobile terminal according to one embodiment of the present invention.

The controller 180 according to one embodiment of the present invention alerts the user to the presence of the mutually matched information using various visual effects. As one example, as illustrated in FIGS. 4(a) to 4(c), the controller 180 performs highlighting processing on the part of the visual information that is matched with the audio. On the other hand, when the highlighted part of the visual information is selected by the user, the controller 180 outputs the matched audio.

Then, as another example, as illustrated in FIG. 6A, the controller 180 performs the highlighting processing on the part of the visual information that is matched with the audio and at the same time, outputs graphic objects 611 and 612 for immediately outputting the matched audio. In addition, the controller 180 may output only the graphic objects 611 and 612 without performing the highlighting processing on the matched part of the visual information. The controller 180 outputs the matched audio in response to the selection of the graphic objects 611 and 612. On the other hand, the graphic objects are output to the vicinity of or to close to a region in which the matched visual information is included. If the multiple pieces of matched visual information are present, the graphic objects are output to the multiple pieces of matched visual information, respectively.

As another example, as illustrated in FIG. 6B, the controller 180 outputs graphic objects 621, 622, and 623 each of which includes at least one matched part of the visual information to one region 620 of the display unit 151. The controller 180 outputs the matched audio in response to the selection of such graphic objects 621, 622, and 623. On the other hand, if one such graphic object is selected, the controller 180 controls the display unit 151 in such a manner that the part of the visual information that is matched with the audio corresponding to the selected graphic object is immediately output. That is, if the matched part of the visual information is not output to the display unit 151, the controller 180 controls the display unit 151 in such a manner as to change the visual information that is output to the display unit 151.

On the other hand, the controller 180 outputs the graphic objects 621, 622, 623 and at the same time, performs the highlighting processing on the part of the visual information that is matched with the audio (for example, "justice," "diplomatic rights," and "five treaties").

Figure 7A:
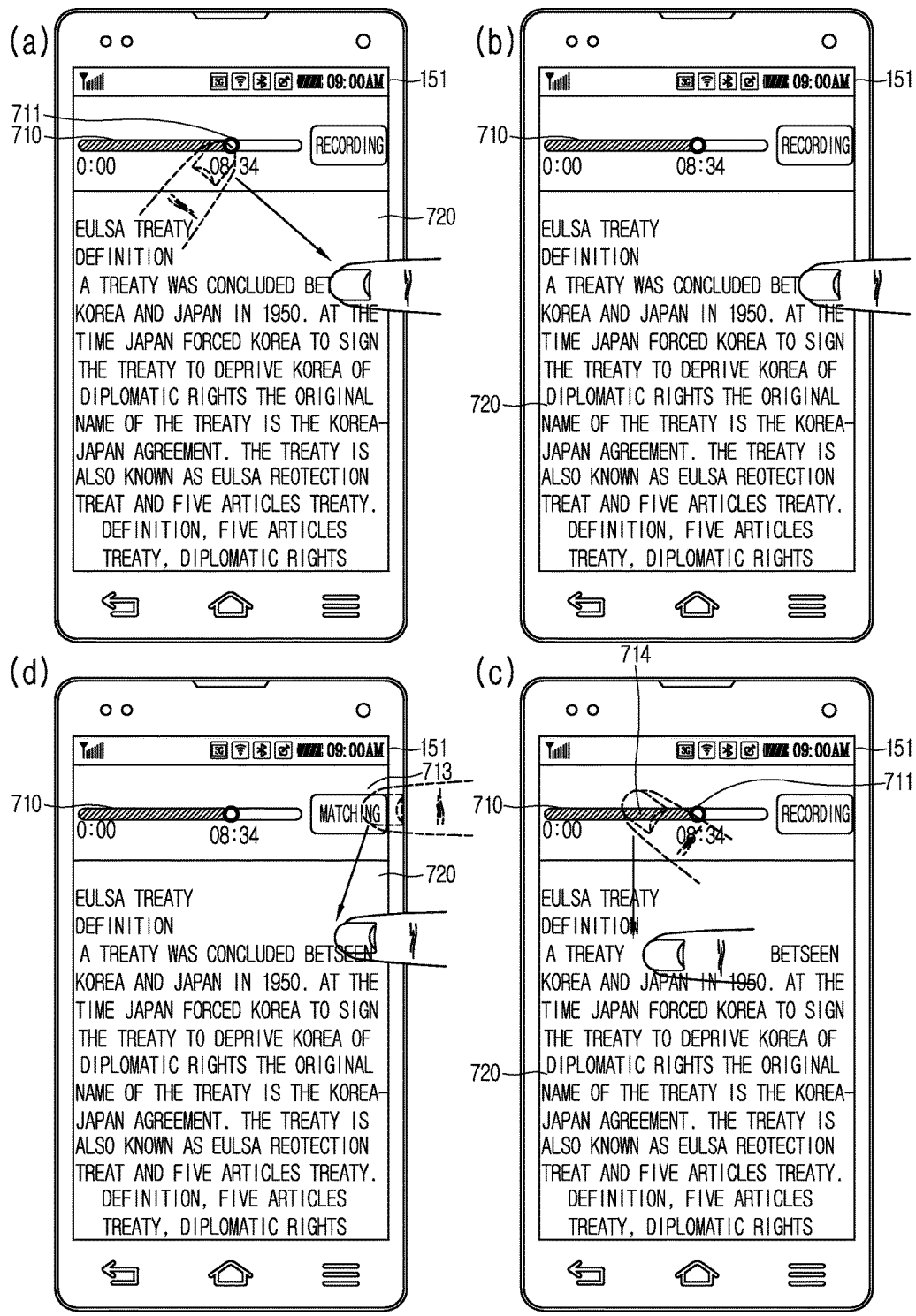
FIGS. 7A(a), 7A(b), 7A(c), 7A(d), 7B(a), 7B(b), 7C(a), 7C(b) and 7C(c) are diagrams for describing a method of matching visual information and audio in the mobile terminal according to one embodiment of the present invention.

A method of matching the audio and the visual information using a progress bar is described in detail below referring to the accompanying drawings. FIGS. 7A(a) to 7A(d), 7B(a) and 7B(b) and 7C(a) to 7C(c) are diagrams for describing the method of matching the visual information and the audio in the mobile terminal according to one embodiment of the present invention.

On the other hand, in the mobile terminal according to another embodiment of the present invention, if the recording is in progress, the graphic object is indicated by a progress bar 710 on the display unit 151 as illustrated in FIGS. 7A(a) to 7A(d) in order to alert the user that the recording of the audio is currently in progress.

The progress bar 710 includes an indicator 711 indicating a current amount of recording with respect to a total amount of recording. If the total amount of audio to be recorded is not available, the indicator indicating the current amount of recorded audio is displayed in the middle of the progress bar. The progress bar visually indicates a current amount of recording time (for example, 3 minutes) with respect to a total amount of recording time (for example, 5 minutes).

On the other hand, when the input touch is applied to the indicator 711 and then is dragged to one region to which visual information 720 is output (or when the touch is dragged and then is released) as illustrated in FIG. 7A(a), the controller 180 matches the audio that is recorded at a time in point corresponding to a time in point when the input touch is applied to the indicator 711 and the visual information that is output to the one region.

As another example, when a predetermined-type input touch (for example, a long input touch) is applied with respect to one region of the visual information 720 as illustrated in FIG. 7A(b), the controller 180 mutually matches the information included in the one region (for example, "diplomatic rights") and the audio that is recorded at the one embodiment of the present invention when the predetermined-type input touch is applied.

As another example, as illustrated in FIG. 7A(c), the controller 180 sets a separate icon 713 corresponding to a matching function in place and mutually matches at least one part of the visual information and the audio based on the selection of the icon 713.

On the other hand, when although the input touch is not applied with respect to the indicator 711, it is applied by the user with respect to an arbitrary point 714 on the progress bar 710 as illustrated in FIG. 7A(d), the controller 180 mutually matches the audio that is recorded at a point in time corresponding to the arbitrary point 714 and the visual information (a specific part of the visual information that is specified by the user).

Figure 7B:
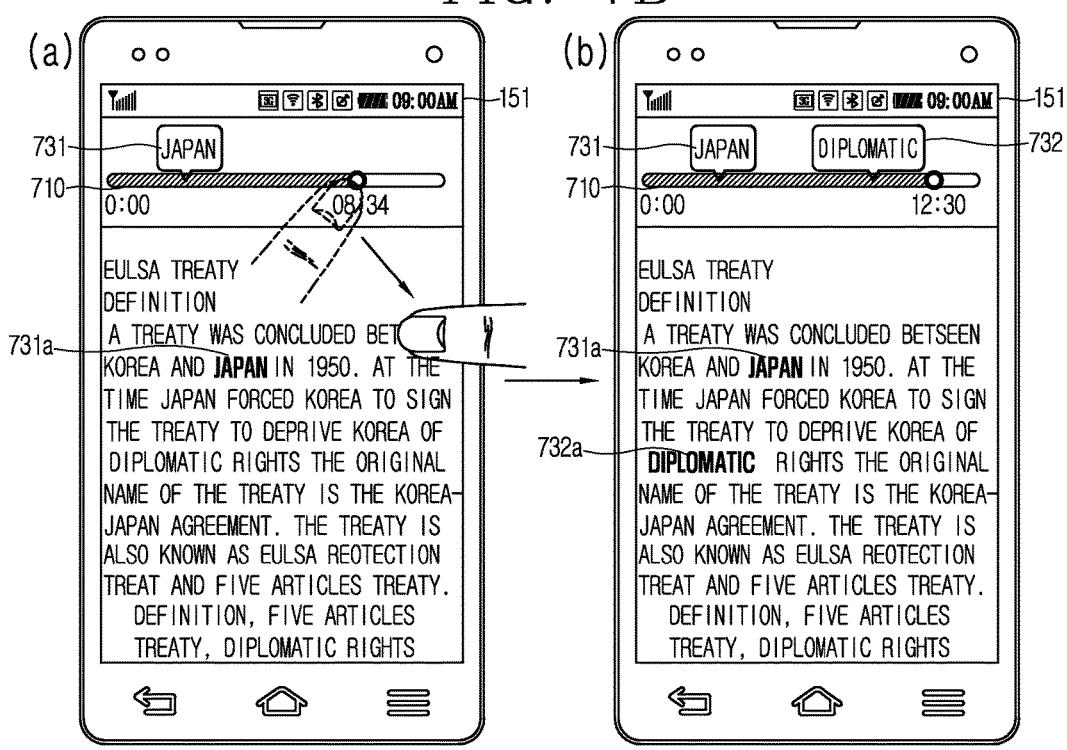

On the other hand, as illustrated in FIGS. 7B(a) and 7B(b), the controller 180 outputs graphic objects 731 and 732, which alert the user to the presence of the matched visual information, to the vicinity of the progress bar 710. One such graphic object 731, as illustrated, includes content associated with the matched visual information in such a manner that at least one matched part 731a or 732a of the visual information is identifiable to the user, In addition, such graphic objects 731 and 732 are positioned at a point on the progress bar 710, which corresponds to a point with which the visual information is matched.

For example, if the visual information "diplomatic rights" is matched with the audio recorded about 8 minutes 34 seconds after the start of the recording, the graphic object 732 corresponding to "diplomatic rights" is output to a region of the progress bar 710 that corresponds to 8 minutes 34 seconds.

Figure 7C:
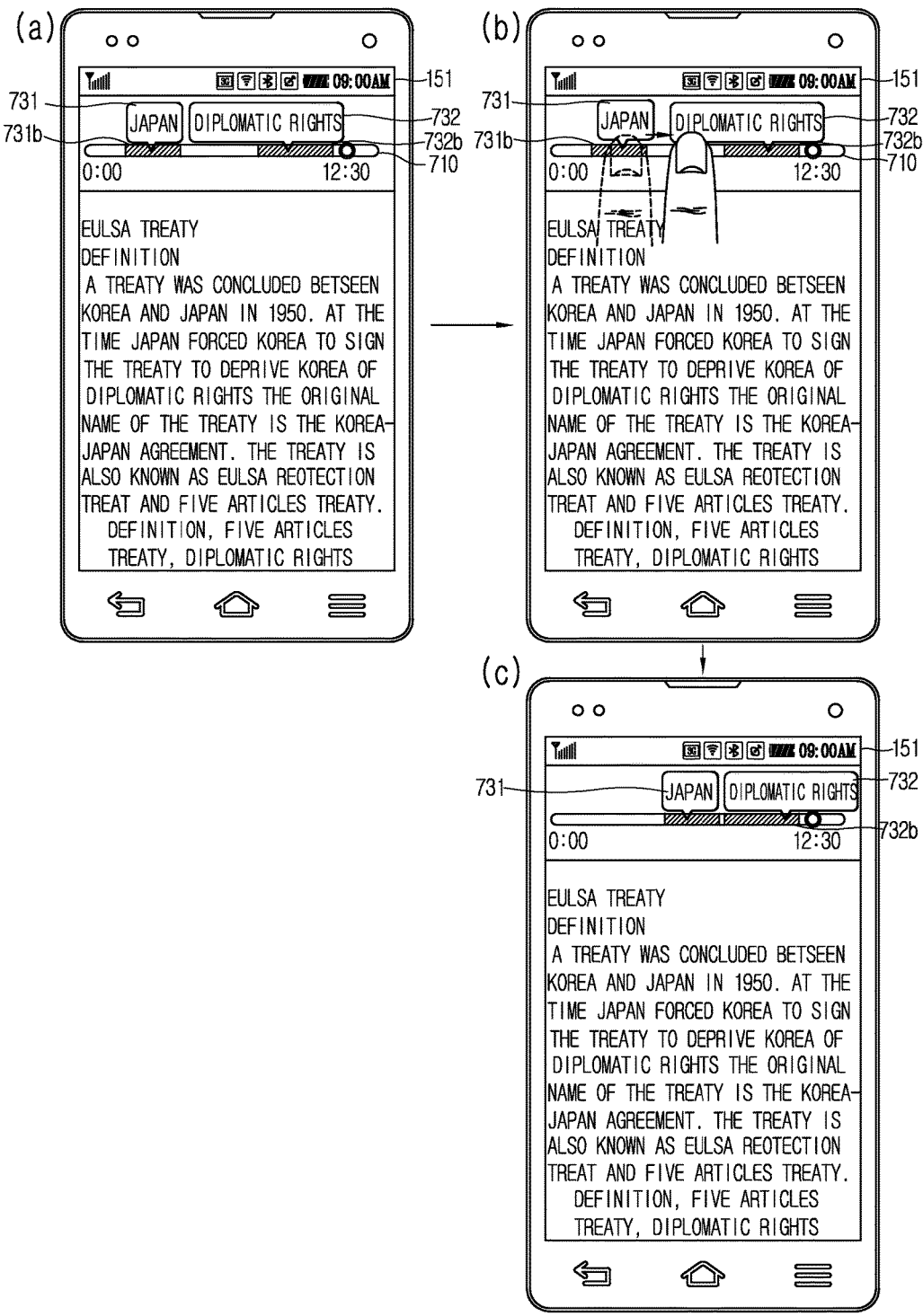

On the other hand, in the mobile terminal according to one embodiment of the present invention, as illustrated in FIG. 7C(a), the graphic objects 731 and 732 alerting the user that the visual information is matched is output and at the same time, regions 731b and 732b of the progress bar 710, which correspond to the matched audio, are displayed in such a manner that they are distinguishable from other regions of the progress bar 710. Then, if the graphic object 731 is moved based on the selection by the user as illustrated in FIG. 7C(b), the controller 180 changes a matched part 732c of the audio as illustrated in FIG. 7C(c). In addition, if the graphic object 731 is moved, the controller 180 outputs a matched part of the audio, with which the graphic object 731 is matched. In addition, a speed at which the audio that is output is played back is in proportion to a speed at which the graphic object 731 is moved. Furthermore, if the graphic object 731 is moved to a point beyond the point on the progress bar 710 with which an amount of the audio is already matched, the controller 180 continuously outputs up to an amount of the audio that corresponds to the point beyond the point on the progress bar 710 with which the amount of the audio is matched. In addition, the controller 180 ends playing back of the audio, corresponding to ending of movement of the graphic object 731.

As described above, the mobile terminal according to one embodiment of the present invention and the method of controlling the mobile terminal provides a GUI environment in which the visual information and the audio are more conveniently matched with each other, by using the progress bar.

Figure 8A:
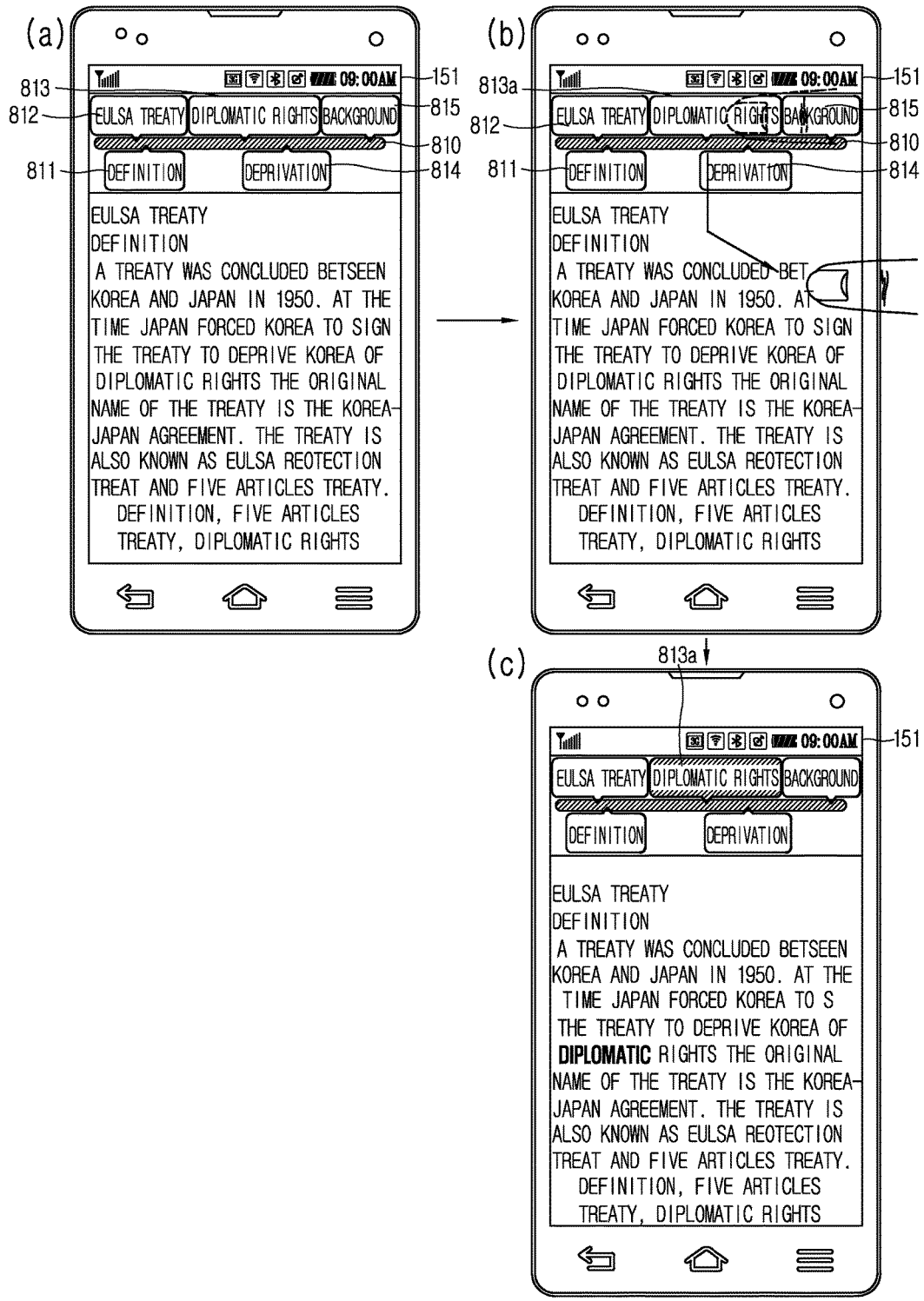
FIGS. 8A(a), 8A(b), 8A(c), 8B(a), 8B(b) and 8B(c) are diagrams for describing a method of using SST conversion in the mobile terminal according to one embodiment of the present invention.

A method of matching more conveniently the visual information with the audio using speak-to-text (SST) conversion with respect to the audio is described in detail below referring to the accompanying drawings. FIGS. 8a(a) to 8a(c), and 8b(a) to 8b(c) are diagrams for describing a method of using SST conversion in the mobile terminal according to one embodiment of the present invention.

In the mobile terminal according to one embodiment of the present invention, text corresponding to the recorded audio can be extracted using the STT conversion. In this case, there are present a variety of criteria for extracting the text that are available for the STT conversion. So, the specific restriction of the criteria is omitted.

On the other hand, in this case, the controller 180 outputs at least one graphic object 811, 812, 813, 814, or 815 that includes at least one part of the resulting text to the vicinity of a progress bar 810 as illustrated in FIG. 8A(a).

In addition, based on the movement of the one graphic object 813 to one region of the visual information as illustrated in FIG. 8A(b), the controller 180 mutually matches the visual information corresponding to the one region (for example, "diplomatic rights") and the audio corresponding to the one graphic object 813 as illustrated in FIG. 8A(c).

In this case, the controller 180 performs the highlighting processing on at least one of the visual information corresponding to the one region and at least one graphic object 813a.

Figure 8B:
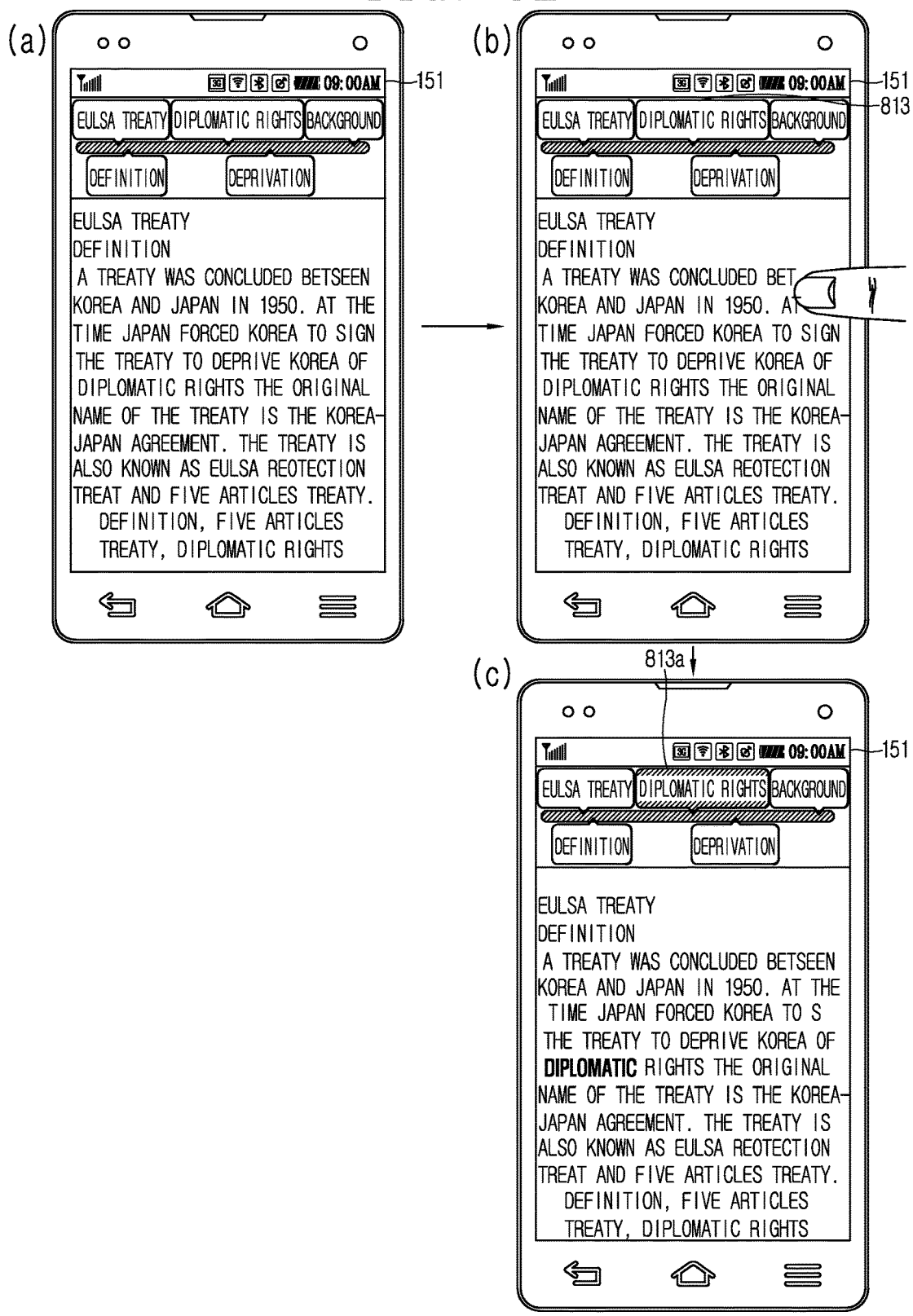

On the other hand, the controller 180 mutually matches the information corresponding to the one region (for example, "diplomatic rights") and the audio corresponding to the associated graphic object 813, in response to the application of the predetermined-type input touch with respect to one region of the visual information as illustrated in FIG. 8B(b). In this case, as illustrated in FIG. 8B(c), the controller 180 performs the highlighting processing on at least one of the visual information corresponding to the one region and the one graphic object 813a.

Figure 9A:
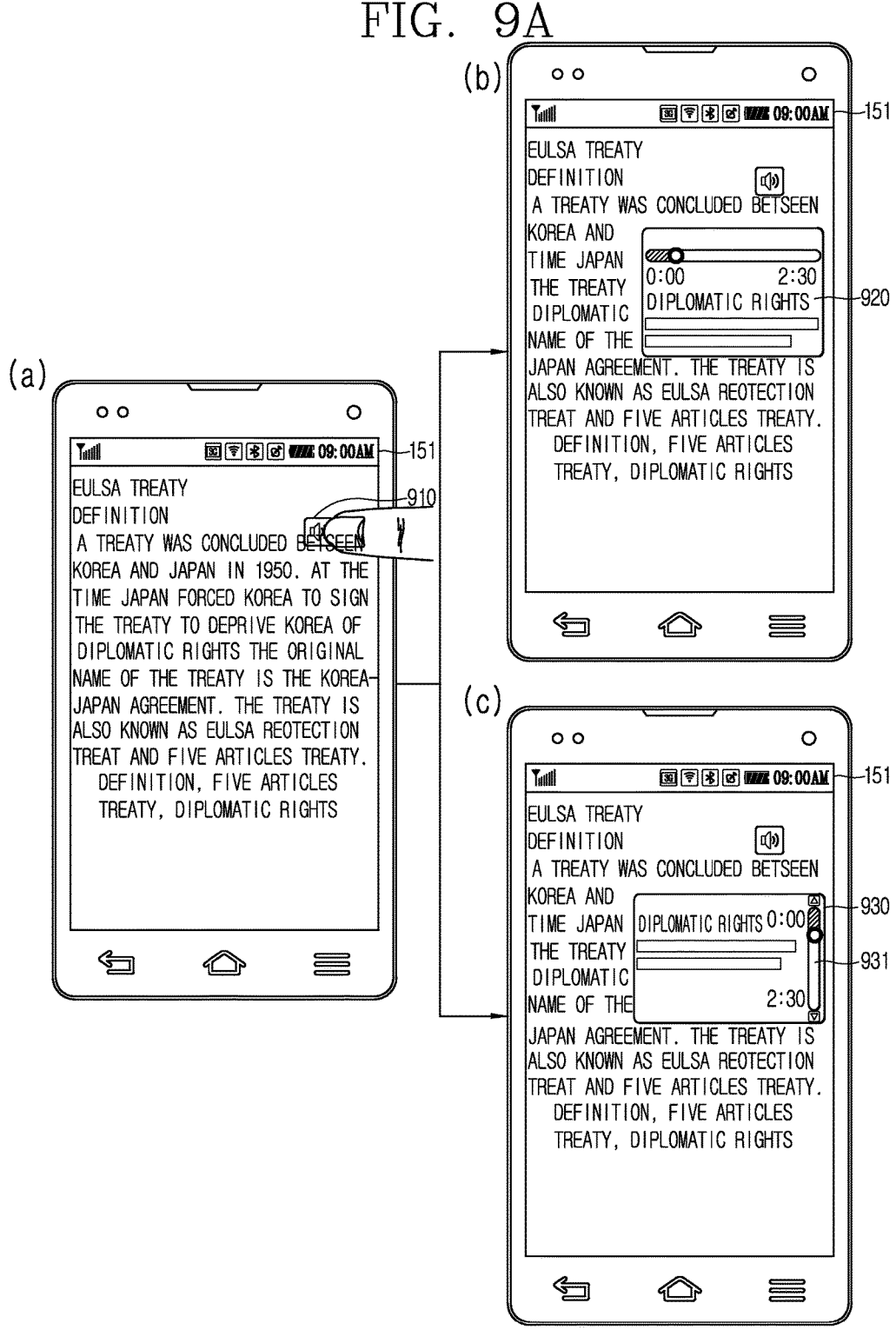
FIGS. 9A(a), 9A(b), 9A(c), 9B(a) and 9B(b) are diagrams for describing a method of outputting matched information in the mobile terminal according to one embodiment of the present invention.

A method of providing the matched information is described in detail below referring to the accompanying drawings. FIGS. 9A(a) to 9A(c) and 9B(a) to 9B(b) are diagrams for describing the method of outputting the matched information in the mobile terminal according to one embodiment of the present invention.

If the visual information and the audio information are matched with each other in the mobile terminal according to one embodiment of the present invention, a graphic object 910 for outputting the matched audio information is output as illustrated in FIG. 9A(a). Then, if the graphic object 910 is selected, the controller 180 outputs the matched audio as illustrated in FIGS. 9A(b) and 9A(c) and displays a status on the progress in outputting the matched audio along with the visual information using pop-up windows 920 and 930. In addition, as illustrated in FIG. 9A(b), the controller 180 displays a scroll bar of the pop-up window 930 in the form of the progress bar. In this case, the controller 180 automatically scrolls a screen of the pop-up window 930 according to the status on the progress in outputting the audio. On the other hand, although not illustrated, the controller 180 uses a visual animation effect to alert the user to the extent to which the progress is made according to the status on the progress in outputting the audio information. For example, the controller 180 provides the UI as if the pop-up window were filled up with water according to the status on the progress in outputting the audio.

Figure 9B:
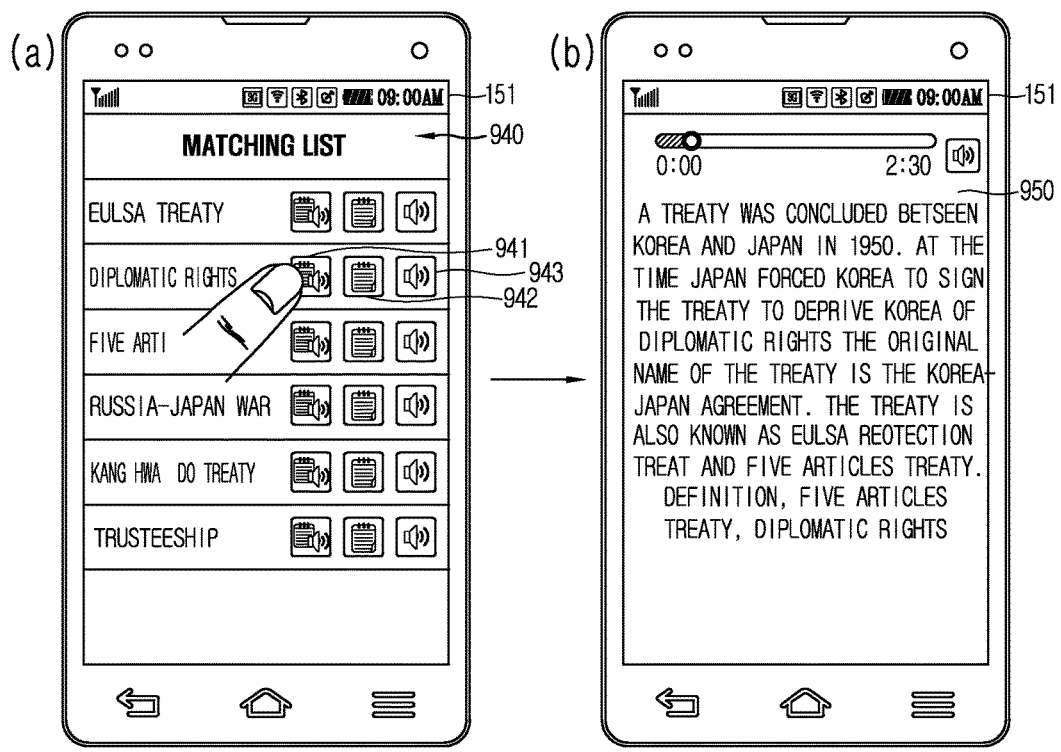

On the other hand, as illustrated FIG. 9B(a), the mobile terminal according to one embodiment of the present invention provides a matching list 940 through which the matched audio and visual information are identified on one screen. In this case, no matter what application is executed, the controller 180 displays whatever information is matched, on the matching list 940.

On the other hand, different icons 941, 942, and 943 are provided on the matching list, according to the information that is output, in order for the user to select information to be desirably used from among the visual information and audio information, the visual information, and the audio information. Therefore, when the icon 941 for outputting the visual information and the audio information together is selected, the controller 180 outputs visual information 950 and audio information that are matched with each other, illustrated in FIG. 9B(b).

In addition, although not illustrated, when the icon 942 for outputting only the visual information is selected, the controller 180 outputs only visual information to the display unit 151 and when the icon 943 for outputting only the audio information is selected, outputs only the corresponding audio to the display unit 151.

As described above, in the mobile terminal according to one embodiment of the present invention and the method of controlling the mobile terminal, the audio and the visual information associated with the audio, for example, the text such as the content of the note, are matched with each other, and the audio and the visual information that are matched with each other are output. Therefore, the user can be provided with associated pieces of information altogether.

Furthermore, in the mobile terminal according to one embodiment of the present invention and the method of controlling the mobile terminal, the user is alerted to the presence of the visual information matched with the audio through GUI corresponding to the audio output function. Therefore, the user can be easily aware that the pieces of information associated with each other are present.

In addition, in the mobile terminal according to one embodiment of the present invention and the method of controlling the mobile terminal, if the visual information with which the audio is matched is output, the graphic object alerting the user to the presence of the matched audio is output, and when using this, the matched audio is output. Therefore, the user can easily access the pieces of information that are associated with each other.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

With regard to the mobile terminal described and cloud system described above, the configuration and method of the embodiments described above are not given any limitation to their applications, and all of, or some of the embodiments may be selectively combined with each other in a manner that creates various modifications.

The invention claimed is:

1. A mobile terminal comprising:
a recording function unit that records external audio;
a touch screen; and
a controller configured to:
control the touch screen to display visual information comprising text and a graphic object for receiving a request for recording of the external audio;
perform, in response to a selection of the graphic object, the recording of the external audio in a state in which the visual information is displayed;
receive a touch input starting from the graphic object and ending at a region at which the visual information is displayed;
match a specific portion of the text displayed at the region with a specific portion of the external audio that was recorded at a point in time at which the touch input starting from the graphic object was received;
control the touch screen to highlight the display of the specific portion of the text to indicate an existence of the match of the specific portion of the text with the specific portion of the recorded external audio; and
output the specific portion of the recorded external audio when the highlighted display of the specific portion of the text is touched after the recording of the external audio is completed.

2. The mobile terminal of claim 1,
wherein the specific portion of the recorded external audio comprises audio data that has been recorded a predetermined time earlier than the point in time at which the touch input starting from the graphic object was received.

3. The mobile terminal of claim 1, wherein the graphic object comprises information output to the touch screen alerting a user that the external audio is being recorded through the recording function unit.

4. The mobile terminal of claim 3, wherein the touch input comprises a first touch input and a second touch input,
wherein the selection of the graphic object and the region is made through the first touch input with respect to the graphic object and the second touch input is in succession to the first touch input and is ended at one point corresponding to the region.

5. The mobile terminal of claim 4, wherein the graphic object is a progress bar indicating a status on progress in the recording of the external audio by the recording function unit, and
wherein when the first touch input is applied with respect to the progress bar, the controller matches the specific portion of the external audio that is recorded at the point in time corresponding to a point in time at which the first touch input is applied at the graphic object.

6. The mobile terminal of claim 5, wherein the controller converts the specific portion of the external audio that is recorded through the recording function unit into text, based on speech-to-text (SST) conversion and outputs at least one part of the resulting text close to or in a vicinity of the progress bar, and
wherein the at least one part of the text is output to a position that corresponds to a point on the progress bar that corresponds to a point in time when the specific portion of the external audio corresponding to the at least one part of the text is recorded.

7. The mobile terminal of claim 5, wherein the controller outputs an icon that alerts a user that the specific portion of the text displayed at the region is matched with a region corresponding to a point on the progress bar, to which the first touch input is applied.

8. The mobile terminal of claim 7, wherein when the icon is selected after ending the recording of the external audio by the recording function unit, the controller outputs the specific portion of the text displayed at the region, along with the specific portion of the external audio that is recorded at a point in time corresponding to the point in time at which the first touch input is applied.

9. The mobile terminal of claim 1, wherein the controller outputs an icon that alerts a user to a presence of the specific portion of the recorded external audio matched with a second region adjacent to the region.

10. The mobile terminal of claim 1, wherein an amount of the specific portion of the recorded external audio matched with the specific portion of the text displayed at the region is represented by a time from a point in time corresponding to a point in time when the region is selected to a point in time when a command to end the matching is generated.

11. A method of controlling a mobile terminal, the method comprising:
controlling a touch screen to display visual information comprising text and a graphic object for receiving a request for recording of external audio;
performing, in response to a selection of the graphic object, the recording of the external audio in a state in which the visual information is displayed;
receiving a touch input starting from the graphic object and ending at a region at which the visual information is displayed;
matching a specific portion of the text displayed at the region with a specific portion of the external audio that was recorded at a point in time at which the touch input starting from the graphic object was received;
controlling the touch screen to highlight the display of the specific portion of the text to indicate an existence of the match of the specific portion of the text with the specific portion of the recorded external audio; and
outputting the specific portion of the recorded external audio when the highlighted display of the specific portion of the text is touched after the recording of the external audio is completed.

* * * * *